UNITED STATES PATENT OFFICE.

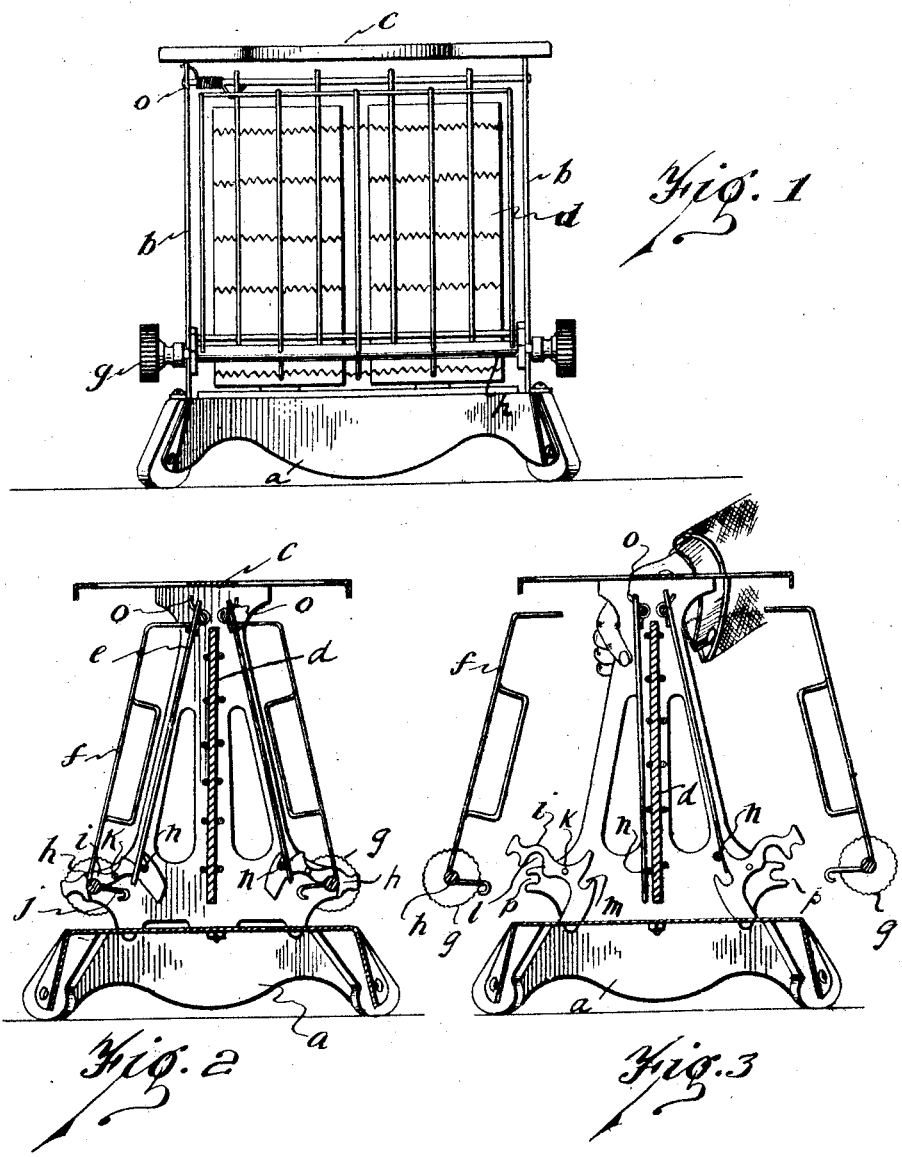

LLOYD G. COPEMAN, OF FLINT, MICHIGAN.

TOASTER.

1,356,042.

Specification of Letters Patent.

Patented Oct. 19, 1920.

Application filed October 31, 1919. Serial No. 334,738.

*To all whom it may concern:*

Be it known that I, LLOYD G. COPEMAN, a citizen of the United States, residing at Flint, in the county of Genesee and State of Michigan, have invented certain new and useful Improvements in Toasters, of which the following is a specification.

This invention relates to toasters and has for its object an electric toaster with a movable toasting grid which can be unlocked and moved outwardly to enable one to clean the same.

In a vertical toaster, especially in a toaster of the turn-over type, that is, one which is adapted to reverse the bread, a great many crumbs collect under the two grids at each side and it is very difficult to get at these unless a spatula, knife or some other thin instrument is used. It is the object of the present invention to afford a toaster in which the grids may be moved out of the way to allow the hand to be inserted in this place to clean it out. A further object of the invention is to cheapen the manufacture of toasters of this type by providing an easier method of assembly. These and other objects will appear as the detailed construction is understood.

In the drawings,—

Figure 1 is a side elevation of a toaster equipped with my invention.

Fig. 2 is a cross section of the same showing the grids locked in place.

Fig. 3 is a cross section of the same showing how the grids can be moved for cleaning.

The toaster comprises a base $a$ provided with suitable legs, end uprights $b$, and a top $c$. The resistance coils are carried on mica or porcelain slabs $d$. It is usual in this form of construction to provide a stationary grid that has the position of the grid $e$ shown in Fig. 2. This is assembled in place by having the ends of the top and bottom horizontal cross rod reduced in diameter and adapted to be inset in perforations in the end walls $d$.

A grid similar to the grid $f$ shown in Fig. 2, and which is the movable or pivoted grid, is assembled in the end walls by unscrewing thumb nuts similar to the knobs $g$ on the ends of the lower rod $h$ and springing the end walls $b$, $b$ over the threaded ends of this rod. This requires considerable distortion of the end walls in order to get the threaded reduced portion through the perforations in the end walls.

The "turn-over" toaster is provided with extensions $j$ to serve the useful purpose of holding the bottom edge of the toast or bread and when the bread is toasted on one side the turning of the grid by the aid of the knobs $g$ serves to bring the extensions up under the bread and kick the bread over so that it slides down the extensions and reverses itself.

The difficulty which this invention is aimed to eliminate is that in a toaster of this character the grids are comparatively close to the top of the base $a$ and the crumbs from the bread and the toast drop down upon the table-like portion of the base and are hard to reach because the bottom of the grid and the extensions prevent anything but a very thin instrument being inserted in this place. I overcome this difficulty by providing a special form of trigger latch $i$. This trigger latch is pivoted at $k$ and provided with a recess $l$ adapted to fit over the bottom cross rod $h$ of the outside grid and with a recess $m$ adapted to fit under the bottom cross rod $n$ of the inner grid. This is shown nicely in Fig. 2, where this trigger latch is shown holding both the grids, while in Fig. 3 the trigger latch is released and the inner grid pushed back by the hand against the resistance of the torsional spring $o$ while the outer grid $f$ is completely removed from the slots $p$. Hence the table portion of the base may be reached without any difficulty at all and the crumbs brushed out.

The trigger latch $i$ is pivoted tightly to the end wall so that there is considerable friction between the two that will enable the latch to be held in any position to which it is turned. The recesses $m$ which fix the rods $n$ of the inner grid in place eliminate the necessity of assembling the walls over the ends of the rods $n$. The use of the recesses $l$, the trigger latches, and the slots $p$, which form the bearing for the cross rods $h$ of the grids $f$, affords a very much easier assembly than the previous practice to use simply perforations and to distort the end walls and spring them over the reduced threaded ends of the cross rods $h$. Furthermore, it makes a cheaper and a better grid construction for the necessity of the thumb nuts is eliminated. The knobs *g* may be soldered or formed as an integral part of the rod if this construction is desirable. In the other method of construction it is absolutely necessary to have detachable thumb nuts in order to complete the assembly.

What I claim is:

1. In a vertical toaster, the combination of a base, supports, and a pair of grids, the inner grid being stationary when the toaster is ready for service, the outer grid being pivotally supported when the toaster is ready for service, the two grids however being capable of being moved out of place to enable the toaster to be cleaned.

2. In a vertical toaster, the combination of a base, supports, a pair of grids supported by the supports, the outer grid being pivotally supported and the inner grid fixedly supported when the toaster is in service but the outer grid being completely removable and the inner grid capable of being swung inwardly when it is desired to clean the toaster.

3. In a toaster, the combination of a pair of supports, a heating element, and a pair of grids, one of which is held in fixed position when the toaster is in service and the other in pivotal position when the toaster is in service, both of said grids however being movable for the purpose of cleaning the said toaster when this is desired.

4. In a toaster, the combination of a heating element, supports, a pair of grids located on one side of the heating element and one of which is pivotally supported, and means for holding the pivotally supported grid removably upon the supports and the other grid movable on the support when the same is released.

5. In a toaster, the combination of supports, a heating element, a pair of trigger latches on the supports, said trigger latches adapted to hold the outer grid pivotally but removably upon the supports and the inner grid fixedly when in service but movably when it is desired to clean the toaster.

6. In a toaster, the combination of a heating element, a pair of end supports, a grid pivoted at its top to the end supports, said end supports being provided with bearing recesses for the outer grid, and triggers pivoted to the end supports for holding the outer grid removably but pivotally in the bearing recesses and for holding the bottom of the inner grid fixedly but movably when desired.

7. In a vertical toaster, the combination of a heating element, a pair of upright end supports, an inner grid secured at its top to the end supports, said end supports provided with slotted bearing recesses and an outer grid adapted to pivotally fit into the slotted bearing recesses at its bottom, and a pair of triggers pivotally supported by the end supports intermediate the two grids and each provided with a pair of recesses, one of which is adapted to swing over the bearing recess of the end support to assemble the outer grid movably in place and the other recess of which is adapted to swing over the lower end of the inner grid to assemble the same removably in place.

8. In a toaster, the combination of a base, a heating element, a grid next adjacent the heating element, a pair of supports for pivotally supporting said grid, a spring for normally keeping the grid turned outward, and means for holding the grid in such outward position but capable of being released to allow the grid to be swung in against the resistance of the spring.

9. In a toaster, the combination of a base, a pair of supports, a pivoted grid, and means for releasably securing the pivoted grid to the supports to allow the removal of the pivoted grid.

10. In a toaster, the combination of a base, a pair of supports, a heating element, a grid, and means for securing the grid upon the supports releasably so that the same may be moved to clean the base.

11. In a toaster, the combination of a base, a pair of supports, a heating element, a grid, and a latch for releasably securing the grid upon the supports to allow movement of the grid to reach the table of the base.

In testimony whereof I affix my signature.

LLOYD G. COPEMAN.